United States Patent [19]

Poetsch et al.

[11] Patent Number: 5,384,066
[45] Date of Patent: Jan. 24, 1995

[54] ELECTROOPTICAL SYSTEM

[75] Inventors: Eike Poetsch, Mühltal; Raymond Jubb, Darmstadt; Ulrich Finkenzeller, Plankstadt; Thomas Jacob, Ober-Ramstadt; Jörg Ohngemach, Reinheim; Stefan Wilhelm, Heppenheim, all of Germany

[73] Assignee: Merck Patent Gesellschaft Mit Beschrankter Haftung, Darmstadt, Germany

[21] Appl. No.: 826,947

[22] Filed: Jan. 27, 1992

[30] Foreign Application Priority Data

Jan. 25, 1991 [DE] Germany .............................. 4102215
Feb. 12, 1991 [DE] Germany .............................. 4104183

[51] Int. Cl.$^6$ ......................... C09K 19/52; G02F 1/13
[52] U.S. Cl. ............................... 252/299.01; 359/103; 359/51; 359/52
[58] Field of Search .................... 252/299.01; 428/1; 359/51, 52, 103, 104

[56] References Cited

U.S. PATENT DOCUMENTS

| 4,797,228 | 1/1989 | Goto et al. | 252/299.63 |
| 4,909,602 | 3/1990 | Kaneoko et al. | 359/51 |
| 5,122,295 | 6/1992 | Weber et al. | 252/299.01 |
| 5,122,297 | 6/1992 | Reiffenrath et al. | 252/299.63 |
| 5,167,860 | 12/1992 | Sawada et al. | 252/299.63 |
| 5,323,251 | 6/1994 | Coates et al. | 252/299.01 |

FOREIGN PATENT DOCUMENTS 313053  4/1989  European Pat. Off. .

OTHER PUBLICATIONS

"Polymer–Dispersed Liquid Crystals" West, in Liquid Crystalline Polymers Edited by Weiss & Ober, pp. 475-495, 1990.

Primary Examiner—Shean Wu
Attorney, Agent, or Firm—Millen, White, Zelano, & Branigan

[57] ABSTRACT

The invention relates to a microdroplet or network system which is provided with active matrix addressing and whose liquid-crystal mixture contains one or more compounds of the formula I and in which the polymerization of the optically transparent medium is initiated by a photoinitiator which forms free radicals.

17 Claims, No Drawings

ELECTROOPTICAL SYSTEM

SUMMARY OF THE INVENTION

The invention relates to an electrooptical system
which contains, between 2 electrode layers, a liquid-crystal mixture and further an optically transparent polymeric medium, one of the electrode layers being formed as an active matrix having nonlinear addressing elements integrated into the pixel, while the other electrode layer forms the counterelectrode, whose liquid-crystal molecules have an irregular alignment in the switched-off state, in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and which has reduced transmission in one of the two switching states compared with the other state, irrespective of the polarization of the incident light.

The optically transparent medium may contain liquid-crystal microdroplets which are delimited from one another or may form a sponge-like, 3-dimensional network whose pores, which are interconnected to a greater or lesser extent, contain the liquid crystal. The term liquid-crystal microdroplets characterizes small liquid-crystal compartments which are delimited from one another, but in no way necessarily have a spherical shape, but may have an irregular shape and/or be deformed.

If the optically transparent medium contains liquid-crystal microdroplets, it is denoted below as a microdroplet system; if, by contrast, it has a sponge-like, 3-dimensionally crosslinked structure, the medium is characterised by the term network.

NCAP and PDLC films (NCAP=nematic curvilinear aligned phases, PDLC=polymer dispersed liquid crystal) are examples of microdroplet systems. Such arrangements are described, for example, in U.S. Pat. No. 4,435,047, EP 0,272,582, U.S. Pat. Nos .4,688,900, 4,671,611and Mol. Cryst. Liq. Cryst. Inc. Nonlin. Optics 157 (1988) 427. By contrast, the arrangement described in EP 0,313,053 is a network or PN system (PN=polymer network), in which the optically transparent medium has a sponge-like network structure.

The nonlinear elements used to produce the active matrix can have 2 or 3 connections. The elements having 2 connections are, for example, α-Si:H diodes (N. Szydloe et al., Proc. 3rd Int. Display Res. Conf., Kobe; SID Los Angeles, 1983, p. 416), NINα-Si:H diodes (Z. Yaniv et al., Conf. Rec. 1985 Intern. Display Research Conference, IEEE, New York, 1985, p. 76), α-Si:H ring diodes (S. Togashi et al., Proceedings of the 4th International Display Research Conference, SEE, Paris, 1984, p. 141), MIM or MSI diodes (metal-insulator-metal, metal-silicon nitride-indium tin oxide; D. R. Baraff et al., Digest SID International Symposium, Los Angeles, 1980, p. 200; M. Suzuki et al., Proceedings of the 6th International Display Research Conference, Japan Display '86, 1986, p. 72) or ZnO varistores (D.E. Castleberry et al., SID '82 Digest, 1982, p. 246). The nonlinear elements having 3 connections are thin-film transistors (TFT), of which several types are discussed, differing through the semiconductor material used (for example α-Si:H, p-Si, CdSe, Te and further materials; see, for example, P. M. Knoll, Displays, Heidelberg 1986, p. 216; T. Nishimura, Mat. Res. Soc. Symp. Proc. 33 (1984) 221; C. S. Bak et al., Mat. Res. Soc. Symp. Proc. 33 (1984) 215; W. G. Bawkins et al., Mat. Res. Soc. Symp. Proc. 33 (1984) 231; M. Matsuura et al., SID 1983 Symposium Digest, 1983, p. 148).

If nonlinear elements having 3 connections are used, only one connection is generally necessary for the counterelectrode, while the counterelectrode is usually also scanned in the case of active matrix addressing based on elements having 2 connections. However, active matrix addressing based on elements having 2 connections in which only one electrode is scanned has also been proposed (Y. Baron et al., Proceedings of the 6th International Research Conference 1986, Japan Display '86, p. 86), and furthermore the use of TFTs as an element having only 2 connections has also been discussed (C. Hilsum et al., Displays, January 1986, p. 37).

Further details on the addressing of liquid-crystal displays by an active matrix of nonlinear elements are given, for example, in A. H. Firester, SID, 1987, Society for Information Display Seminar, Seminar 5: Active Matrices for Liquid Crystals, E. Kaneko, Liquid Crystal Displays, KTK Scientific Publishers, Tokyo, Japan, 1987, chapters 6 and 7, and P. M. Knoll, Displays, Heidelberg, 1986, p. 216 ff.

Polarizers are not required for operating microdroplet or network systems, and these systems thus have high transmission. Due to these favorable transmission properties, microdroplet or network systems provided with active matrix addressing have been proposed, in particular, for projection applications, but also for displays having a high information content and further applications.

The liquid-crystal mixtures used in the production of microdroplet or network systems must satisfy a very wide variety of demands. Thus, one of the refractive indices of the liquid crystal in microdroplet systems is selected so that it more or less coincides with the refractive index of the medium $n_m$. In network systems, matching of the refractive indices is not absolutely necessary since the liquid-crystal content in the light-modulating layer is usually very much greater, but may be carried out in order to increase the light transmission and the contrast.

The liquid-crystal mixture may be dielectrically positive or dielectrically negative. The use of dielectrically positive liquid-crystal mixtures is preferred, and in this case the ordinary refractive index $n_o$ is generally matched to the refractive index of the matrix $n_m$. Other matchings are described in the literature (see, for example, EP 0,272,585) or can be determined without difficulty by a person skilled in the art.

The matching of the refractive indices means that, in the addressed state, incident light sees virtually no difference in refractive index between the aligned liquid-crystal molecules and the medium, and the arrangement appears transparent. Furthermore, the liquid crystal should have a high clearing point, a broad nematic range, no smectic phases down to low temperatures and high stability and should be characterised by an optical anisotropy $\Delta n$ and flow viscosity $\eta$ which can be optimized with respect to particular application and by a high dielectric anisotropy $\Delta\epsilon$. Furthermore, the liquid-crystal mixture should be readily compatible with the monomers and/or prepolymers of the polymer used to produce the microdroplet or network system and should be characterized by low solubility in the cured polymer.

A number of materials and processes have been proposed hitherto for production of the matrix. Thus, for example, NCAP films are obtained by the process described in U.S. Pat. No. 4,435,047 by intimately mixing the encapsulating polymer material, such as, for example, polyvinyl alcohol, the liquid-crystal mixture and a carrier material, such as, for example, water, in a colloid mill. By contrast, in the PIPS (polymerisation induced phase separation) process described in Mol. Cryst. Liq. Cryst. Inc. Nonlin. Optics 157 (1988), 427, and in the process indicated in EP 0,272,585, the liquid-crystal mixture is first mixed with monomers or oligomers of the film-forming polymer before the polymerisation is initiated. The microdroplet system described in Mol. Cryst. Liq. Cryst. Inc. Nonlin. Opt. 157 (1988), 427, is based on an epoxide film, while the arrangement indicated in EP 0,272,585 is an acrylate system.

Addressing of the microdroplet or network system by means of an active matrix has a further crucial criterion in addition to the requirements mentioned above which must be satisfied by the liquid-crystal mixture, the monomers or prepolymers and the cured polymer. This is associated with the fact that, with respect to the particular active nonlinear element, each pixel is a captive load which is charged in the rhythm of the addressing cycle. It is of crucial importance here that the voltage applied to an addressed pixel only drops by a small amount until the pixel is recharged in the next addressing cycle. A quantitative measure of the drop in voltage applied to a pixel is the so-called holding ratio (HR), which is defined as the ratio between the drop in voltage over a pixel in the nonaddressed state and the applied voltage; a method of determining the HR is indicated, for example, in B. Rieger et al., Conference Proceedings of the Freiburger Arbeitstagung Flüssigkristalle [Freiburg Liquid-Crystals Conference], Freiburg 1989. Electro-optical systems having a low or relatively low HR have inadequate contrast.

Although considerable efforts have already been made to optimize microdroplet and network systems with respect to the liquid-crystal mixture used and the polymer system, only few investigations are found in the literature on electrooptical systems based on microdroplet or network systems and having active matrix addressing, and no new concepts have hitherto been proposed for the provision of electrooptical systems having a high HR. The systems indicated hitherto do not satisfactorily meet the requirements for favorable properties of the liquid-crystal mixture used, the monomers or oligomers and the cured polymer while at the same time having a high HR of the overall system.

There is thus a great demand for electrooptical systems which satisfy the outlined requirements to a large extent and, in particular, have a high HR.

The invention has the object of providing electrooptical systems of this type.

It has been found that this object can be achieved if liquid-crystal mixtures which contain at least one compound of the formula I

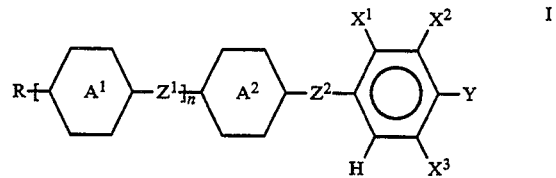

in which $Z^1$ and $Z^2$ independently of one another, are a single bond, —CH$_2$CH$_2$—, —COO—, —OCO— or —C≡C—,

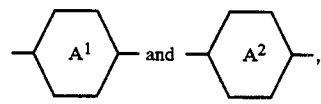

independently of one another are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

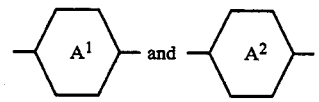

is alternatively pyrimidine-2,5-diyl, pyridine-2,5-diyl or trans-1,3-dioxane-2,5-diyl, $X^1$, $X^2$ and $X^3$ independently of one another, are H or F, Y is —F, —Cl, —OCF$_3$, —OCHF$_2$ or —CF$_3$, n is 0, 1 or 2, and R is alkyl having up to 12 carbon atoms in which, in addition, one or two non-adjacent CH$_2$ groups may be replaced by —O— and/or —CH═CH—, are used for these systems, and if the polymerization of the optically transparent medium is initiated by a photoinitiator which forms free radicals.

The invention thus relates to an electrooptical system
which contains, between 2 electrode layers, a liquid-crystal mixture and a further optically transparent polymeric medium, one of the electrode layers being formed as an active matrix having nonlinear addressing elements integrated into the pixel, while the other electrode layer forms the counterelectrode, whose liquid-crystal molecules have an irregular alignment in the switched-off state, in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and which has reduced transmission in one of the two switching states compared with the other state, irrespective of the polarization of the incident light, where the liquid-crystal mixture contains one or more compounds of the formula I and the polymerization of the medium is initiated by a photoinitiator which forms free radicals.

For reasons of simplicity, Phe below denotes 1,4-phenylene, Phe.2F denotes 2-fluoro-1,4-phenylene, Phe.3F denotes 3-fluoro-1,4-phenylene, Cyc denotes trans-1,4-cyclohexylene, Pyr denotes pyrimidine-2,5-diyl and Pyd denotes pyridine-2,5-diyl, the two abbreviations Pyr and Pyd in each case covering the two possible positional isomers. Furthermore, Phe.(F) denotes a 1,4-phenylene group which may be unsubstituted or monofluorinated in the 2- or 3-position or difluorinated in the 3- and 5-positions. Phe.3F is a 1,4-phenylene group which is monofluorinated by F in the 3-position, and Phe.2F and Phe.5F have corresponding meanings; Phe.3F$_5$F denotes a 3,5-disubstituted 1,4-phenylene group, while Phe. F$_2$ is a 1,4-phenylene group which is 2,3-disubstited by fluorine.

Electroptical systems whose liquid-crystal mixture contains one or more bicyclic compounds of the formula I2 are preferred:

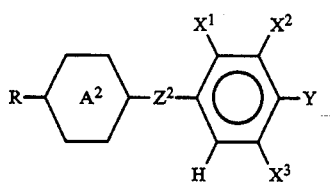
I2

In the compounds of the formula I2, R is preferably alkyl or alkoxy having 1-10, but in particular 1-8, carbon atoms, straight-chain radicals being preferred. Further preferred are n-alkoxyalkyl compounds and in particular n-alkoxymethyl and n-alkoxyethyl compounds.

$Z^2$ is preferably —CH$_2$CH$_2$—, —COO— or a single bond, in particular a single bond or —CH$_2$CH$_2$—, and very particularly a single bond. Y is —F, —Cl, —OCHF$_2$, —OCF$_3$ or —CF$_3$ and in particular —F, —Cl, —OCF$_3$ or —CF$_3$.

Compounds of the formula I2 in which at least one of $X^1$, $X^2$ and $X^3$ and in particular of $X^2$ and $X^3$ is not H are particularly preferred. Very particularly preferred compounds of the formula I2 are those in which $X^1=X^2=$H, $X^3=$F and Y=—F, —Cl, —OCHF$_2$, —OCF$_3$ or —CF$_3$.

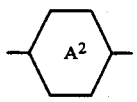

is preferably Cyc, Phe.(F), Pyr, Pyd or Dio and in particular Cyc, Phe.(F), Pyr or Pyd.

Very particular preference is given to electroptical systems whose liquid-crystal mixture contains one or more bicyclic compounds selected from the following smaller group of compounds of the formulae I2-1–I2-115:

| | |
|---|---|
| R—Cyc—Phe—F | I2-1 |
| R—Cyc—Phe.3F—F | I2-2 |
| R—Cyc—Phe.3F5F—F | I2-3 |
| R—Cyc—Phe—Cl | I2-4 |
| R—Cyc—Phe.3F—Cl | I2-5 |
| R—Cyc—Phe.3F5F—Cl | I2-6 |
| R—Cyc—Phe—OCHF$_2$ | I2-7 |
| R—Cyc—Phe.3F—OCHF$_2$ | I2-8 |
| R—CyC—Phe.3F5F—OCHF$_2$ | I2-9 |
| R—Cyc—Phe—OCF$_3$ | I2-10 |
| R—Cyc—Phe.3F—OCF$_3$ | I2-11 |
| R—Cyc—Phe.3F5F—OCF$_3$ | I2-12 |
| R—Cyc—Phe—CF$_3$ | I2-13 |
| R—Cyc—Phe.3F—CF$_3$ | I2-14 |
| R—Cyc—Phe.3F5F—CF$_3$ | I2-15 |
| R—Phe—Phe—F | I2-16 |
| R—Phe—Phe.3F—F | I2-17 |
| R—Phe—Phe.3F5F—F | I2-18 |
| R—Phe.3F5F—Phe—F | I2-19 |
| R—Phe—Phe—Cl | I2-20 |
| R—Phe—Phe.3F—Cl | I2-21 |
| R—Phe—Phe.3F5F—Cl | I2-22 |
| R—Phe.3F5F—Phe—Cl | I2-23 |
| R—Phe—Phe—OCHF$_2$ | I2-24 |
| R—Phe—Phe.3F—OCHF$_2$ | I2-25 |
| R—Phe—Phe.3F5F—OCHF$_2$ | I2-26 |
| R—Phe.3F5F—Phe—OCHF$_2$ | I2-27 |
| R—Phe—Phe—OCF$_3$ | I2-28 |
| R—Phe—Phe.3F—OCF$_3$ | I2-29 |
| R—Phe—Phe.3F5F—OCF$_3$ | I2-30 |
| R—Phe.3F5F—Phe—OCF$_3$ | I2-31 |
| R—Phe—Phe—CF$_3$ | I2-32 |
| R—Phe—Phe.3F—CF$_3$ | I2-33 |
| R—Phe—Phe.3F5F—CF$_3$ | I2-34 |
| R—Phe.3F5F—Phe—CF$_3$ | I2-35 |
| R—Cyc—CH$_2$CH$_2$—Phe—F | I2-36 |
| R—Cyc—CH$_2$CH$_2$—Phe.3F—F | I2-37 |
| R—Cyc—CH$_2$CH$_2$—Phe.3F5F—F | I2-38 |
| R—Cyc—CH$_2$CH$_2$—Phe—Cl | I2-39 |
| R—Cyc—CH$_2$CH$_2$—Phe.3F—Cl | I2-40 |
| R—Cyc—CH$_2$CH$_2$—Phe.3F5F—Cl | I2-41 |
| R—Cyc—CH$_2$CH$_2$—Phe—OCHF$_2$ | I2-42 |
| R—Cyc—CH$_2$CH$_2$—Phe.3F—OCHF$_2$ | I2-43 |
| R—Cyc—CH$_2$CH$_2$—Phe.3F5F—OCHF$_2$ | I2-44 |
| R—Cyc—CH$_2$CH$_2$—Phe—OCF$_3$ | I2-45 |
| R—Cyc—CH$_2$CH$_2$—Phe.3F—OCF$_3$ | I2-46 |
| R—Cyc—CH$_2$CH$_2$—Phe.3F5F—OCF$_3$ | I2-47 |
| R—Cyc—CH$_2$CH$_2$—Phe—CF$_3$ | I2-48 |
| R—Cyc—CH$_2$CH$_2$—Phe.3F—CF$_3$ | I2-49 |
| R—Cyc—CH$_2$CH$_2$—Phe.3F5F—CF$_3$ | I2-50 |
| R—Cyc—COO—Phe—F | I2-51 |
| R—Cyc—COO—Phe.3F—F | I2-52 |
| R—Cyc—COO—Phe.3F5F—F | I2-53 |
| R—Cyc—COO—Phe—Cl | I2-54 |
| R—Cyc—COO—Phe.3F—Cl | I2-55 |
| R—Cyc—COO—Phe.3F5F—Cl | I2-56 |
| R—Cyc—W—Phe—OCHF$_2$ | I2-57 |
| R—Cyc—COO—Phe.3F—OCHF$_2$ | I2-58 |
| R—Cyc—COO—Phe.3F5F—OCHF$_2$ | I2-59 |
| R—Cyc—COO—Phe—OCF$_3$ | I2-60 |
| R—Cyc—COO—Phe.3F—OCF$_3$ | I2-61 |
| R—Cyc—COO—Phe.3F5F—OCF$_3$ | I2-62 |
| R—Cyc—COO—Phe—CF$_3$ | I2-63 |
| R—Cyc—COO—Phe.3F—CF$_3$ | I2-64 |
| R—Cyc—COO—Phe.3F5F—CF$_3$ | I2-65 |
| R—Phe—COO—Phe—F | I2-66 |
| R—Phe—COO—Phe.3F—F | I2-67 |
| R—Phe—COO—Phe.3F5F—F | I2-68 |
| R—Phe.3F5F—COO—Phe—F | I2-69 |
| R—Phe—COO—Phe—Cl | I2-70 |
| R—Phe—COO—Phe.3F—Cl | I2-71 |
| R—Phe—COO—Phe.3F5F—Cl | I2-72 |
| R—Phe.3F5F—COO—Phe—Cl | I2-73 |
| R—Phe—COO—Phe—OCHF$_2$ | I2-74 |
| R—Phe—COO—Phe.3F—OCHF$_2$ | I2-75 |
| R—Phe—COO—Phe.3F5F—OCHF$_2$ | I2-76 |
| R—Phe.3F5F—COO—Phe—OCHF$_2$ | I2-77 |
| R—Phe—COO—Phe—OCF$_3$ | I2-78 |
| R—Phe—COO—Phe.3F—OCF$_3$ | I2-79 |
| R—Phe—COO—Phe.3F5F—OCF$_3$ | I2-80 |
| R—Phe.3F5F—COO—Phe—OCF$_3$ | I2-81 |
| R—Phe—COO—Phe—CF$_3$ | I2-82 |
| R—Phe—COO—Phe.3F—CF$_3$ | I2-83 |
| R—Phe—COO—Phe.3F5F—CF$_3$ | I2-84 |
| R—Phe.3F5F—COO—Phe—CF$_3$ | I2-85 |
| R—Pyr—Phe—F | I2-86 |
| R—Pyr—Phe.3F—F | I2-87 |
| R—Pyr—Phe.3F5F—F | I2-88 |
| R—Pyr—Phe—Cl | I2-89 |
| R—Pyr—Phe.3F—Cl | I2-90 |
| R—Pyr—Phe.3F5F—F—Cl | I2-91 |
| R—Pyr—Phe—OCHF$_2$ | I2-92 |
| R—Pyr—Phe.3F—OCHF$_2$ | I2-93 |

| | |
|---|---|
| R—Pyr—Phe.3F5F—F—OCHF$_2$ | I2-94 |
| R—Pyr—Phe.3F—OCF$_3$ | I2-96 |
| R—Pyr—Phe.3F5F—F—OCF$_3$ | I2-97 |
| R—Pyr—Phe—CF$_3$ | I2-98 |
| R—Pyr—Phe.3F—CF$_3$ | I2-99 |
| R—Pyr—Phe.3F5F—F—CF$_3$ | I2-100 |
| R—Pyd—Phe—F | I2-101 |
| R—Pyd—Phe.3F—F | I2-102 |
| R—Pyd—Phe.3F5F—F | I2-103 |
| R—Pyd—Phe—Cl | I2-104 |
| R—Pyd—Phe.3F—Cl | I2-105 |
| R—Pyd—Phe.3F5F—F—Cl | I2-106 |
| R—Pyd—Phe—OCHF$_2$ | I2-107 |
| R—Pyd—Phe.3F—OCHF$_2$ | I2-108 |
| R—Pyd—Phe.3F5F—F—OCHF$_2$ | I2-109 |
| R—Pyd—Phe—OCF$_3$ | I2-110 |
| R—Pyd—Phe.3F—OCF$_3$ | I2-111 |
| R—Pyd—Phe.3F5F—F—OCF$_3$ | I2-112 |
| R—Pyd—Phe—CF$_3$ | I2-113 |
| R—Pyd—Phe.3F—CF$_3$ | I2-114 |
| R—Pyd—Phe.3F5F—CF$_3$ | I2-115 |

Preference is furthermore given to electrooptical systems whose liquid-crystal mixture contains one or more tricyclic compounds of the formula I3:

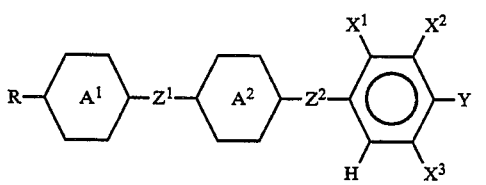

I3

In the compounds of the formula I3, R is preferably n-alkyl, or n-alkoxy having 1-10 carbon atoms, and in addition n-alkoxymethyl or n-alkoxyethyl having 1-8 carbon atoms.

Very particular preference is given to compounds of the formula I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. $Z^1$ and $Z^2$ in the compounds of the formula I3 are, independently of one another, preferably —CH$_2$CH$_2$—, —COO— or a single bond and in particular —CH$_2$CH$_2$— or a single bond. Particular preference is given to compounds of the formula I3 in which at least one of $Z^1$ and $Z^2$ is a single bond. Y is —F, —Cl, —OCHF$_2$, —OCF$_3$ or —CF$_3$ and in particular —F, —Cl, —OCHF$_2$ or —OCF$_3$. Compounds of the formula I3 in which $X^1$=H and $X^2$ and/or $X^3$=F are preferred.

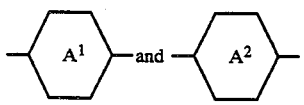

are, independently of one another, Cyc, Phe.(F), Pyr, Pyd or Dio and in particular Cyc, Phe.(F), Pyr or Pyd.

Electrooptical systems whose liquid-crystal mixture contains one or more compounds selected from the following smaller group of compounds of the formulae I3-1–I3-160 are particularly preferred:

| | |
|---|---|
| R—Cyc—Cyc—Phe—F | I3-1 |
| R—Cyc—Cyc—Phe.3F—F | I3-2 |
| R—Cyc—Cyc—Phe.3F5F—F | I3-3 |
| R—Cyc—Cyc—Phe—Cl | I3-4 |
| R—Cyc—Cyc—Phe.3F—Cl | I3-5 |
| R—Cyc—Cyc—Phe.3F5F—Cl | I3-6 |
| R—Cyc—Cyc—Phe—OCHF$_2$ | I3-7 |
| R—Cyc—Cyc—Phe.3F—OCHF$_2$ | I3-8 |
| R—Cyc—Cyc—Phe.3F5F—OCHF$_2$ | I3-9 |
| R—Cyc—Cyc—Phe—OCF$_3$ | I3-10 |
| R—Cyc—Cyc—Phe.3F—OCF$_3$ | I3-11 |
| R—Cyc—Cyc—Phe.3F5F—OCF$_3$ | I3-12 |
| R—Cyc—Cyc—Phe—CF$_3$ | I3-13 |
| R—Cyc—Cyc—Phe.3F—CF$_3$ | I3-14 |
| R—Cyc—Cyc—Phe.3F5F—CF$_3$ | I3-15 |
| R—Cyc—Phe—Phe—F | I3-16 |
| R—Cyc—Phe—Phe.3F—F | I3-17 |
| R—Cyc—Phe—Phe.3F5F—F | I3-18 |
| R—Cyc—Phe.3F5F—Phe—F | I3-19 |
| R—Cyc—Phe—Phe—Cl | I3-20 |
| R—Cyc—Phe—Phe.3F—Cl | I3-21 |
| R—Cyc—Phe—Phe.3F5F—Cl | I3-22 |
| R—Cyc—Phe.3F5F—Phe—Cl | I3-23 |
| R—Cyc—Phe—Phe—OCHF$_2$ | I3-24 |
| R—Cyc—Phe—Phe.3F—OCHF$_2$ | I3-25 |
| R—Cyc—Phe—Phe.3F5F—OCHF$_2$ | I3-26 |
| R—Cyc—Phe.3F5F—Phe—OCHF$_2$ | I3-27 |
| R—Cyc—Phe—Phe—OCF$_3$ | I3-28 |
| R—Cyc—Phe—Phe.3F—OCF$_3$ | I3-29 |
| R—Cyc—Phe—Phe.3F5F—OCF$_3$ | I3-30 |
| R—Cyc—Phe.3F5F—Phe—OCF$_3$ | I3-31 |
| R—Cyc—Phe—Phe—CF$_3$ | I3-32 |
| R—Cyc—Phe—Phe.3F—CF$_3$ | I3-33 |
| R—Cyc—Phe—Phe.3F5F—CF$_3$ | I3-34 |
| R—Cyc—Phe.3F5F—Phe—CF$_3$ | I3-35 |
| R—Phe—Phe—Phe—F | I3-36 |
| R—Phe—Phe—Phe.3F—F | I3-37 |
| R—Phe—Phe—Phe.3F5F—F | I3-38 |
| R—Phe—Phe.3F5F—Phe—F | I3-39 |
| R—Phe—Phe—Phe—Cl | I3-40 |
| R—Phe—Phe—Phe.3F—Cl | I3-41 |
| R—Phe—Phe—Phe.3F5F—Cl | I3-42 |
| R—Phe—Phe.3F5F—Phe—Cl | I3-43 |
| R—Phe—Phe—Phe—OCHF$_2$ | I3-44 |
| R—Phe—Phe—Phe.3F—OCHF$_2$ | I3-45 |
| R—Phe—Phe.3F5F—Phe—OCHF$_2$ | I3-46 |
| R—Phe—Phe.3F5F—Phe—OCHF$_2$ | I3-47 |
| R—Phe—Phe—Phe—OCF$_3$ | I3-48 |
| R—Phe—Phe—Phe.3F—OCF$_3$ | I3-49 |
| R—Phe—Phe.3F5F—Phe—OCF$_3$ | I3-50 |
| R—Phe—Phe.3F5F—Phe—OCF$_3$ | I3-51 |
| R—Phe—Phe—Phe—CF$_3$ | I3-52 |
| R—Phe—Phe—Phe.3F—CF$_3$ | I3-53 |
| R—Phe—Phe.3F5F—Phe—CF$_3$ | I3-54 |
| R—Phe—Phe.3F5F—Phe—CF$_3$ | I3-55 |
| R—Cyc—Pyr—Phe—F | I3-56 |
| R—Cyc—Pyr—Phe.3F—F | I3-57 |
| R—Cyc—Pyr—Phe.3F5F—F | I3-58 |
| R—Cyc—Pyr—Phe—Cl | I3-59 |
| R—Cyc—Pyr—Phe.3F—Cl | I3-60 |
| R—Cyc—Pyr—Phe.3F5F—Cl | I3-61 |
| R—Cyc—Pyr—Phe—OCHF$_2$ | I3-62 |
| R—Cyc—Pyr—Phe.3F—OCHF$_2$ | I3-63 |
| R—Cyc—Pyr—Phe—OCF$_3$ | I3-65 |
| R—Cyc—Pyr—Phe.3F—OCF$_3$ | I3-66 |
| R—Cyc—Pyr—Phe.3F5F—OCF$_3$ | I3-67 |
| R—Cyc—Pyr—Phe—CF$_3$ | I3-68 |
| R—Cyc—Pyr—Phe.3F—CF$_3$ | I3-69 |
| R—Cyc—Pyr—Phe.3F5F—CF$_3$ | I3-70 |
| R—Cyc—Pyd—Phe—F | I3-71 |
| R—Cyc—Pyd—Phe.3F—F | I3-72 |
| R—Cyc—Pyd—Phe.3F5F—F | I3-73 |
| R—Cyc—Pyd—Phe—Cl | I3-74 |
| R—Cyc—Pyd—Phe.3F—Cl | I3-75 |
| R—Cyc—Pyd—Phe.3F5F—Cl | I3-76 |
| R—Cyc—Pyd—Phe—OCHF$_2$ | I3-77 |
| R—Cyc—Pyd—Phe.3F—OCHF$_2$ | I3-78 |
| R—Cyc—Pyd—Phe.3F5F—OCHF$_2$ | I3-79 |
| R—Cyc—Pyd—Phe—OCF$_3$ | I3-80 |
| R—Cyc—Pyd—Phe.3F—OCF$_3$ | I3-81 |
| R—Cyc—Pyd—Phe.3F5F—OCF$_3$ | I3-82 |
| R—Cyc—Pyd—Phe—CF$_3$ | I3-83 |
| R—Cyc—Pyd—Phe.3F—CF$_3$ | I3-84 |
| R—Cyc—Pyd—Phe.3F5F—CF$_3$ | I3-85 |

| -continued | |
|---|---|
| R—Pyr—Phe—Phe—F | I3-86 |
| R—Pyr—Phe—Phe.3F—F | I3-87 |
| R—Pyr—Phe—Phe.3F5F—F | I3-88 |
| R—Pyr—Phe—Phe—Cl | I3-89 |
| R—Pyr—Phe—Phe.3F—Cl | I3-90 |
| R—Pyr—Phe—Phe.3F5F—Cl | I3-91 |
| R—Pyr—Phe—Phe—OCHF$_2$ | I3-92 |
| R—Pyr—Phe—Phe.3F—OCHF$_2$ | I3-93 |
| R—Pyr—Phe—Phe—OCF$_3$ | I3-95 |
| R—Pyr—Phe—Phe.3F—OCF$_3$ | I3-96 |
| R—Pyr—Phe—Phe.3F5F—OCF$_3$ | I3-97 |
| R—Pyr—Phe—Phe—CF$_3$ | I3-98 |
| R—Pyr—Phe—Phe.3F—CF$_3$ | I3-99 |
| R—Pyr—Phe—Phe.3F5F—CF$_3$ | I3-100 |
| R—Pyd—Phe—Phe—F | I3-101 |
| R—Pyd—Phe—Phe.3F—F | I3-102 |
| R—Pyd—Phe—Phe.3F5F—F | I3-103 |
| R—Pyd—Phe—Phe—Cl | I3-104 |
| R—Pyd—Phe—Phe.3F—Cl | I3-105 |
| R—Pyd—Phe—Phe.3F5F—Cl | I3-106 |
| R—Pyd—Phe—Phe—OCHF$_2$ | I3-107 |
| R—Pyd—Phe—Phe.3F—OCHF$_2$ | I3-108 |
| R—Pyd—Phe—Phe.3F5F—OCHF$_2$ | I3-109 |
| R—Pyd—Phe—Phe—OCF$_3$ | I3-110 |
| R—Pyd—Phe—Phe.3F—OCF$_3$ | I3-111 |
| R—Pyd—Phe—Phe.3F5F—OCF$_3$ | I3-112 |
| R—Pyd—Phe—Phe—CF$_3$ | I3-113 |
| R—Pyd—Phe—Phe.3F—CF$_3$ | I3-114 |
| R—Pyd—Phe—Phe.3F5F—CF$_3$ | I3-115 |
| R—Cyc—Cyc—CH$_2$CH$_2$—Phe—F | I3-116 |
| R—Cyc—Cyc—CH$_2$CH$_2$—Phe.3F—F | I3-117 |
| R—Cyc—Cyc—CH$_2$CH$_2$—Phe.3F5F—F | I3-118 |
| R—Cyc—Cyc—CH$_2$CH$_2$—Phe—Cl | I3-119 |
| R—Cyc—Cyc—CH$_2$CH$_2$—Phe.3F—Cl | I3-120 |
| R—Cyc—Cyc—CH$_2$CH$_2$—Phe.3F5F—Cl | I3-121 |
| R—Cyc—Cyc—CH$_2$CH$_2$—Phe—OCHF$_2$ | I3-122 |
| R—Cyc—Cyc—CH$_2$CH$_2$—Phe.3F—OCHF$_2$ | I3-123 |
| R—Cyc—Cyc—CH$_2$CH$_2$—Phe.3F5F—OCHF$_2$ | I3-124 |
| R—Cyc—Cyc—CH$_2$CH$_2$—Phe—OCF$_3$ | I3-125 |
| R—Cyc—Cyc—CH$_2$CH$_2$—Phe.3F—OCF$_3$ | I3-126 |
| R—Cyc—Cyc—CH$_2$CH$_2$—Phe.3F5F—OCF$_3$ | I3-127 |
| R—Cyc—Cyc—CH$_2$CH$_2$—Phe—CF$_3$ | I3-128 |
| R—Cyc—Cyc—CH$_2$CH$_2$—Phe.3F—CF$_3$ | I3-129 |
| R—Cyc—Cyc—CH$_2$CH$_2$—Phe.3F5F—CF$_3$ | I3-130 |
| R—Cyc—CH$_2$CH$_2$—Phe—Phe—F | I3-131 |
| R—Cyc—CH$_2$CH$_2$—Phe—Phe.3F—F | I3-132 |
| R—Cyc—CH$_2$CH$_2$—Phe—Phe.3F5F—F | I3-133 |
| R—Cyc—CH$_2$CH$_2$—Phe—Phe—Cl | I3-134 |
| R—Cyc—CH$_2$CH$_2$—Phe—Phe.3F—Cl | I3-135 |
| R—Cyc—CH$_2$CH$_2$—Phe—Phe.3F5F—Cl | I3-136 |
| R—Cyc—CH$_2$CH$_2$—Phe—Phe—OCHF$_2$ | I3-137 |
| R—Cyc—CH$_2$CH$_2$—Phe—Phe.3F—OCHF$_2$ | I3-138 |
| R—Cyc—CH$_2$CH$_2$—Phe—Phe.3F5F—OCHF$_2$ | I3-139 |
| R—Cyc—CH$_2$CH$_2$—Phe—Phe—OCF$_3$ | I3-140 |
| R—Cyc—CH$_2$CH$_2$—Phe—Phe.3F—OCF$_3$ | I3-141 |
| R—Cyc—CH$_2$CH$_2$—Phe—Phe.3F5F—OCF$_3$ | I3-142 |
| R—Cyc—CH$_2$CH$_2$—Phe—Phe—CF$_3$ | I3-143 |
| R—Cyc—CH$_2$CH$_2$—Phe—Phe.3F—CF$_3$ | I3-144 |
| R—Cyc—CH$_2$CH$_2$—Phe—Phe.3F5F—CF$_3$ | I3-145 |
| R—Cyc—Phe—COO—Phe—F | I3-146 |
| R—Cyc—Phe—COO—Phe.3F—F | I3-147 |
| R—Cyc—Phe—COO—Phe.3F5F—F | I3-148 |
| R—Cyc—Phe—COO—Phe—Cl | I3-149 |
| R—Cyc—Phe—COO—Phe.3F—Cl | I3-150 |
| R—Cyc—Phe—COO—Phe.3F5F—Cl | I3-151 |
| R—Cyc—Phe—COO—Phe—OCHF$_2$ | I3-152 |
| R—Cyc—Phe—COO—Phe.3F—OCHF$_2$ | I3-153 |
| R—Cyc—Phe—COO—Phe.3F5F—OCHF$_2$ | I3-154 |
| R—Cyc—Phe—COO—Phe—OCF$_3$ | I3-155 |
| R—Cyc—Phe—COO—Phe.3F—OCF$_3$ | I3-156 |
| R—Cyc—Phe—COO—Phe.3F5F—OCF$_3$ | I3-157 |
| R—Cyc—Phe—COO—Phe—CF$_3$ | I3-158 |
| R—Cyc—Phe—COO—Phe.3F—CF$_3$ | I3-159 |
| R—Cyc—Phe—COO—Phe.3F5F—CF$_3$ | I3-160 |

Electrooptical systems whose liquid-crystal mixtures contain one or more compounds of the formula I2 or I3 in which $X^2$ and/or $X^3$ are F have advantageous values for the dielectric anisotropy. Electrooptical systems whose liquid-crystal mixture contains one or more compounds of the formulae I2-86–I2-115 and I3-56–I3-115 have particularly advantageous values for $\Delta\epsilon$. Electrooptical systems whose liquid-crystal mixture contains at least one bicyclic compound of the formula I2 and at least one tricyclic compound of the formula I3 are frequently characterized by particularly advantageous properties.

Preference is furthermore given to electrooptical systems whose liquid-crystal mixture contains one or more tetracyclic compounds of the formula I4:

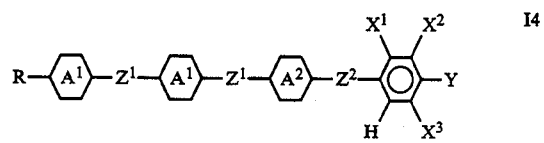

I4

In the compounds of the formulae Ib1–Ib8, R is preferably n-alkyl or n-alkoxy having 1–10 carbon atoms, or alternatively n-alkoxymethyl or n-alkoxyethyl having 1–8 carbon atoms.

Very particular preference is given to compounds of the formula I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular only one of the bridges $Z^1$ and $Z^2$ is not a single bond.

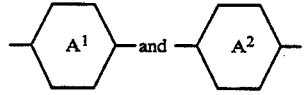

are preferably, independently of one another, Cyc, Phe.2F, Phe.3F, Phe, Pyr or Pyd. Compounds of the formula I4 in which at least one of

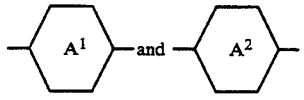

is Phe.2F or Phe.3F are preferred. The proportion by weight of the compounds of the formula I4 in the liquid-crystal mixture of the electrooptical systems according to the invention is preferably not excessive and is in particular less than 20%.

Electrooptical systems whose liquid-crystal mixture contains one or more compounds selected from the following smaller group of compounds of the formulae I4-1–I4-15 are particularly preferred:

| | |
|---|---|
| R—Cyc—Phe.(F)—Phe—(F)—Phe.(F)—F | I4-1 |
| R—Cyc—Phe.(F)—Phe.(F)—Phe.(F)—Cl | I4-2 |
| R—Cyc—Phe.(F)—Phe.(F)—Phe.(F)—OCHF$_2$ | I4-3 |
| R—Cyc—Phe.(F)—Phe.(F)—Phe.(F)—OCF$_3$ | I4-4 |
| R—Cyc—Phe.(F)—Phe.(F)—Phe.(F)—CF$_3$ | I4-5 |
| R—Cyc—Cyc—Phe.(F)—Phe.(F)—F | I4-6 |
| R—Cyc—Cyc—Phe.(F)—Phe.(F)—Cl | I4-7 |
| R—Cyc—Cyc—Phe.(F)—Phe.(F)—OCHF$_2$ | I4-8 |
| R—Cyc—Cyc—Phe.(F)—Phe.(F)—OCF$_3$ | I4-9 |
| R—Cyc—Cyc—Phe.(F)—Phe.(F)—CF$_3$ | I4-10 |
| R—Cyc—Cyc—Cyc—Phe.(F)—F | I4-11 |
| R—Cyc—Cyc—Cyc—Phe.(F)—Cl | I4-12 |
| R—Cyc—Cyc—Cyc—Phe.(F)—OCHF$_2$ | I4-13 |
| R—Cyc—Cyc—Cyc—Phe.(F)—OCF$_3$ | I4-14 |

| -continued | |
|---|---|
| R—Cyc—Cyc—Cyc—Phe.(F)—CF$_3$ | I4-15 |

It has been shown that the electrooptical systems
whose liquid-crystal mixture contains one or more
compounds of the formula I and in particular one
or more compounds of the formulae I2-1-I2-105,
I3-1-I3-150 and I4-1-I4-15 and whose optically transparent polymeric medium is
polymerized by addition of a photoinitiator which
forms free radicals and by subsequent exposure to
light have particularly favorable properties.

These systems are characterised by advantageous values for the threshold voltage, high UV and heat stability, a favorable operating temperature range, favorable values for the temperature dependence of the electrooptical parameters, high contrast and in particular a high HR.

Preference is given to electrooptical systems whose liquid-crystal mixture contains at least one compound of the formula I and whose optically transparent medium is polymerized by a free radical-forming photoinitiator of the formula II

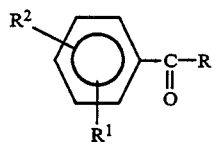  II in which

R is —CR$^3$R$^4$R$^5$ or 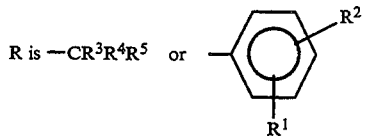

R$^1$ is H, halogen, alkyl having 1-12 carbon atoms in which, in addition, up to 4 non-adjacent CH$_2$ groups may be replaced by —O—, —CO—, —COO—, —OCO—, —CH=CH— or

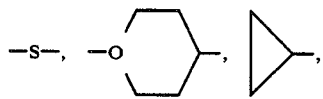

or 2 radicals R$^1$ in the ortho-positions to the carbonyl group are alternatively together a single bond, —CH$_2$—CH$_2$—, —S—,

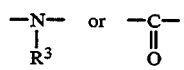

R$^2$ is H, halogen, alkyl having 1-12 carbon in which, in addition, one or 2 non-adjacent CH$_2$ groups may be replaced by —O— or —CH=CH—, or alkanoyl having 1-6 carbon atoms, R$^3$ and R$^4$ are each, independently of one another, H, halogen, hydroxyl, alkyl having 1-12 carbon atoms in which, in addition, one or 2 non-adjacent CH$_2$ groups may be replaced by —O—, —CO— or —CH=CH—, or together are alkylene having 2-10 carbon atoms,

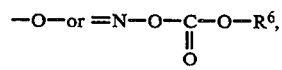

R$^5$ is H, alkyl having 1-12 carbon atoms in which, in addition, one or 2 non-adjacent CH$_2$ groups may be replaced by —O— or —CH=CH—,

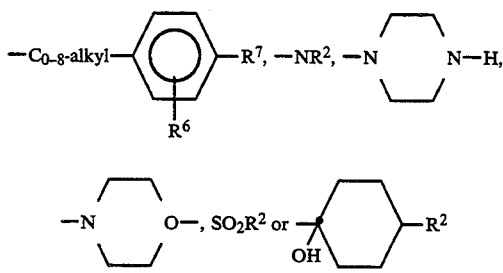

and

R$^6$ and R$^7$ are each, independently of one another, H, halogen, alkyl having 1-10 carbon atoms in which, in addition one or 2 non-adjacent CH$_2$ groups may be replaced by —O—, —CO—, —COO—, —OCO—, —S— or —CH=CH—, or are —NHR$^2$ or —NR$^2$.

Particular preference is given to electrooptical systems in which the polymerization of the optically transparent medium is inititated by means of a photoinitiator of the formula IIa in which R is —CR$^3$R$^4$R$^5$:

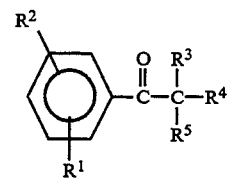  IIa

In the photoinitiators of the formula IIa, R$^1$ and R$^2$, independently of one another, are preferably H, halogen, C$_{1-12}$-alkyl, C$_{1-12}$-alkoxy, C$_{1-12}$-alkenyl, C$_{1-6}$-alkanoyloxy or C$_{1-6}$-alkoxycarbonate. Photoinitiators of the formula IIa in which at least one of the two radicals R$^1$ and R$^2$ is H are preferred.

It is furthermore preferred for one of the radicals R$^1$ and R$^2$ to be oxahexyl, cyclopropyl or oxycyclopropyl. One of the radicals R$^1$ and R$^2$ preferably contains a vinyl or vinylene group, in particular, inter alia, if the monomers or the prepolymers of the transparent medium are vinyl compounds.

Particular preference is furthermore given to photoinitiators of the formula IIa which contain the following combinations for the radicals R$^3$, R$^4$ and R$^5$:

| R$^3$ | R$^4$ | R$^5$ |
|---|---|---|
| H | | (—C$_{1-8}$-alkoxy)$_2$ |
| OH | C$_{1-10}$-alkyl | C$_{1-10}$-alkyl |
| C$_{1-12}$-alkoxy | C$_{1-12}$-alkoxy | unsubstituted or substituted phenyl |
| C$_{1-10}$-alkoxy | H | unsubstituted or substituted phenyl |
| C$_{1-12}$-alkoxy | C$_{1-10}$-alkoxy | H or C$_{1-10}$-alkyl |

-continued

| $R^3$ | $R^4$ | $R^5$ |
|---|---|---|
| or -alkyl | | |
| =N—O—C-alkyl | O | H or $C_{1-10}$-alkyl |
| halogen | halogen —O— | halogen $C_{1-10}$-alkyl —NR$^2$, —N N—H, —N O or —$C_{1-5}$-alkyl-O—R$^7$ —R$^7$ |
| $C_{1-10}$-alkyl | $C_{1-12}$-alkyl or -alkoxy | |
| H or $C_{1-10}$-alkyl | H or $C_{1-10}$-alkyl | 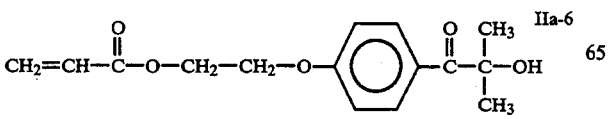 |

Photoinitiators of the formula IIa in which one of $R^3$ and $R^4$ is OH are generally less preferred if $R^1$ and $R^2$, independently of one another, are H or alkyl. By contrast, photoinitiators of this type are frequently particularly preferred if at least one of $R^1$ and $R^2$ is alkoxy, oxaalkyl, alkanoyloxy or alkoxycarbonyl.

Particular preference is given to the following smaller group of photoinitiators of the formulae IIa-1–IIa-11:

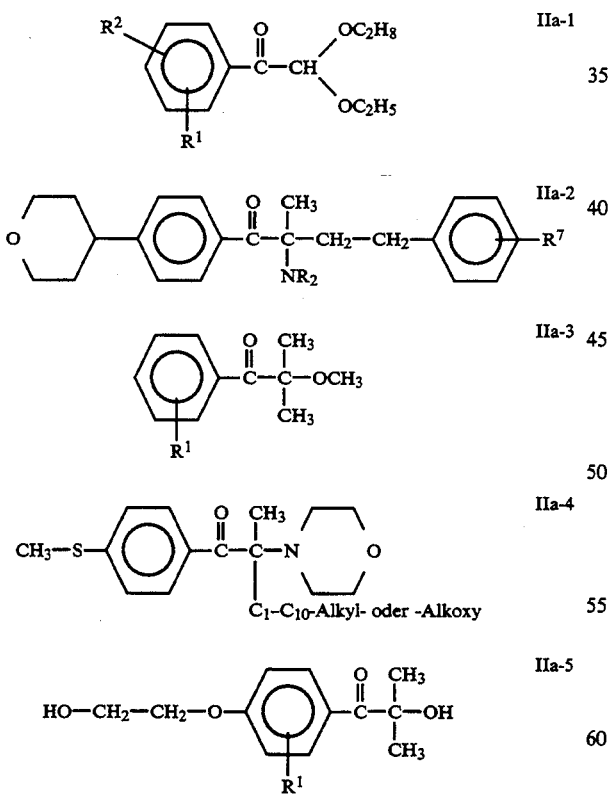

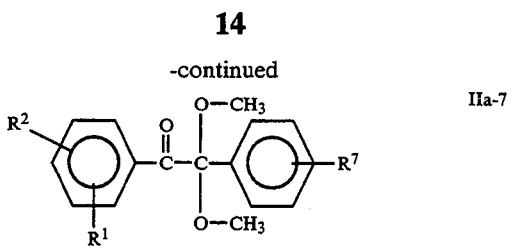

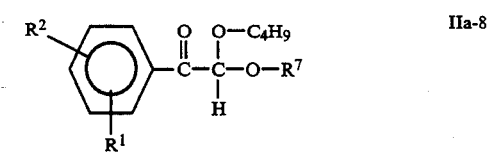

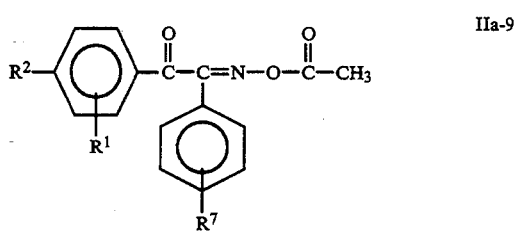

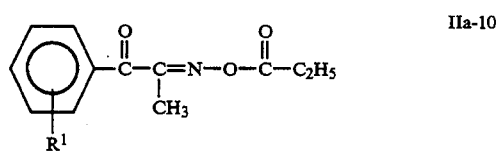

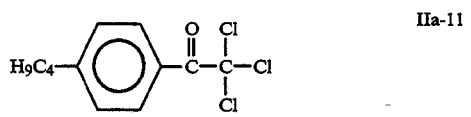

Preference is furthermore to photoinitiators of the formula II in which

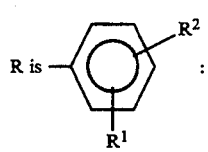

R is

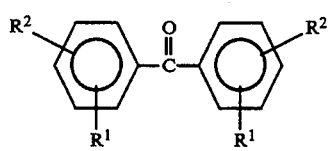

IIb

In a subgroup of these compounds of the formula IIb, an additional central ring is formed via 2 radicals $R^1$ in the ortho-positions; in the compounds of this subgroup of the formula IIbα2, 2 radicals $R^1$ in the ortho-positions together form a single bond,

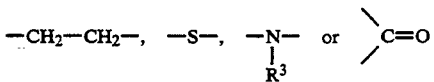

and in particular

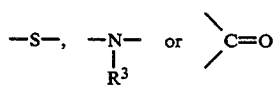

The radicals $R^2$ are preferably, independently of one another, H, halogen, $C_{1-12}$-alkyl, -alkoxy or -alkenyl, furthermore also $C_{1-6}$-alkanoyl or -alkoxycarbonyl and in particular also $C_{1-10}$-alkenoxy. The two radicals $R^2$ may be identical or different from one another and are generally different from one another.

Particular preference is given to the following smaller group of photoinitiators of the formulae IIbα-1–IIbα-2:

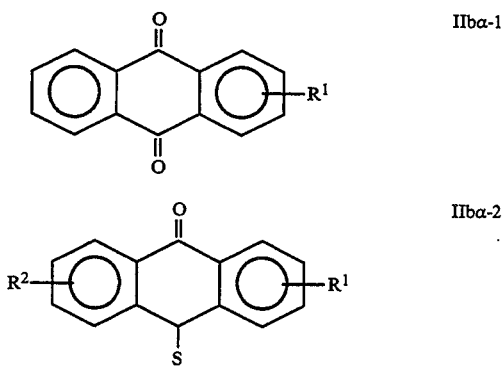

In a second preferred subgroup of the compounds of the formula IIb, no ring closure via the groups $R^1$ takes place. In these compounds, which are denoted by the formula IIbβ, $R^1$ and $R^2$ are preferably, independently of one another, H, halogen, $C_{1-10}$-alkyl, -alkoxy, -alkenyl or -alkenoxy or —N—($C_{1-5}$-alkyl or alkoxy)$_2$. Preference is given to compounds of the formula IIbβ in which either both the phenyl rings, independently of one another, are monosubstituted or unsubstituted or in which one of the phenyl rings is disubstituted while the other is monosubstituted.

Particular preference is given to the following smaller groups of the photoinitiators of the formulae IIbβ1–IIbβ2:

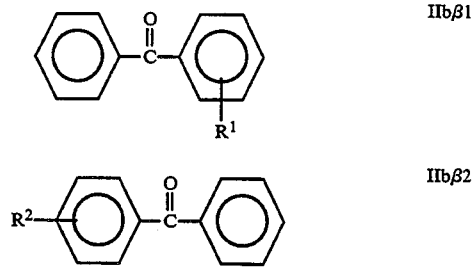

In the photoinitiators of the formula IIa-1, $R^1$ and $R^2$ are very particularly preferably H. In the photoinitiators of the formula IIa-5, $R^1$ is in particular H, and in the photoinitiators of the formula IIa-7, $R^1$ and $R^2$ are in particular both H. Very particular preference is furthermore given to photoinitiators of the formula IIbα-2 where $R^2$=H and $R^1$=—CH(CH$_3$)$_2$ and to photoinitiators of the formula IIbβ1 and IIbβ2 where $R^1$ and $R^2$ respectively are H.

The photoinitiators of the formulae IIa and IIb β are generally photoinitiators of the fragmentation type, in which free radicals are formed with homolytic cleavage of an intramolecular bond. A distinction is made between photoinitiators of α- or Norrish-I-, β-, γ- or Norrish-II-type, depending on the fragmentation mechanism.

By contrast, the photoinitiators of formula IIbα are generally hydrogen abstraction photoinitiators, in which the free radicals are formed by the initiator and a suitable electron donor molecule forming a complex which decomposes to give free radicals with intermolecular hydrogen migration.

However, it is also possible for the photoinitiators of the formula II and of the preferred subformulae to decompose to form free radicals by mechanisms other than those outlined here.

The photoinitiators of the formula II, irrespective of the particular photoreaction mechanisms, are highly suitable for the production of the electrooptical systems according to the invention. This is presumably attributable, inter alia, to the fact that the photoinitiators used according to the invention and the free radicals formed from them have only a slight tendency, or none at all, toward the formation of stable ions under the conditions prevailing during the production of the electrooptical systems according to the invention. The formation of ions would result in a reduction in the specific resistance of the liquid-crystal mixture/polymer system and thus in a reduction in the HR.

However, the particularly advantageous properties of the electrooptical systems and in particular their high HR can only be explained to a limited extent by separate consideration of the individual components used in the production of these systems, such as liquid crystal, monomers, oligomers and/or prepolymers of the optically transparent polymeric medium, photoinitiator etc. This is because the free radicals formed from the photoinitiator molecules do not meet only the monomers to be polymerized, oligomers and/or prepolymers of the optically transparent medium, but also meet the liquid-crystal molecules, which predominantly contain a primary or secondary benzylic group whose free radicals are energetically preferred.

The photoinitiators can thus cause cleavage of the liquid-crystal molecules, so that the knowledge forming the core of the present invention, that the systems according to the invention which contain one or more compounds of the formula I and in which the polymerization of the optically transparent medium is initiated by photoinitiators which form free radicals, have particularly favorable properties and in particular a high HR, can be regarded as being surprising.

For the formation of the optically transparent polymeric medium, olefinically unsaturated monomers, oligomers or prepolymers which can be initiated by means of free radicals, or mixtures of oligomers and/or prepolymers with unsaturated monomers can be used. The monomers, oligomers, prepolymers or mixtures thereof also denoted below as olefinically unsaturated precursors are selected so that the liquid-crystal mixture is readily miscible with the olefinically unsaturated precursor,
the liquid-crystal mixture has low solubility in the optically transparent medium, and
the refractive index of the optically transparent medium essentially corresponds to one of the refractive indices of the liquid-crystal mixture, generally the ordinary refractive index $n_o$.

Through a suitable choice of the respective olefinically unsaturated precursor, the properties of the optically transparent polymeric medium, such as its refractive index, solubility behavior toward the liquid-crystal mixture, hardness, flexability, etc., can be varied within a broad range and optimized with respect to the specific requirements. The miscibility of the olefinically unsaturated precursor with the liquid-crystal mixture can also be varied within a broad range and customized through a suitable modification of the precursor compounds. A person skilled in the art can compose olefinically unsaturated precursors routinely and without any inventive step from the large pool of olefinically unsaturated compounds in such a manner that the abovementioned requirements are satisfied.

A list of classes of suitable olefinically unsaturated compounds is given below, but this should be regarded as illustrative and is intended merely to illustrate the invention, but not to represent a limitation:

Vinyl chlorides, vinylidene chlorides, acrylonitriles, methacrylonitriles, acrylamides, methacrylamides, methyl, ethyl, n- and tert.-butyl, cyclohexyl, 2-ethylhexyl, benzyl, phenyloxyethyl, hydroxyethyl, hydroxypropyl, lower alkoxyethyl and tetrahydrofurfuryl acrylates and methacrylates, vinyl acetates, propionates, acrylates and succinates, N-vinylpyrrolidones, N-vinylcarbazoles, styrenes, divinylbenzenes, ethylene diacrylates, 1,6-hexanediol diacrylates, bisphenol A diacrylates and dimethacrylates, trimethylolpropane diacrylates, pentaerythritol triacrylates, triethylene glycol diacrylates, ethylene glycol dimethacrylates, tripropylene glycol triacrylates, pentaerythritol triacrylates, pentaerythritol tetraacrylates, ditrimethylpropane tetraacrylates and dipentaerythritol pentaacrylates and hexaacrylates.

Further suitable olefinically unsaturated precursors are indicated, for example, in EP 0,272,585 and EP 0,313,053.

The mixture of the olefinically unsaturated precursor and the liquid-crystal mixture may optionally contain further additives, such as, for example, surface-active substances for improving the dispersibility of the liquid-crystal mixture, antioxidants, light stabilizers, etc. These additives should have the highest possible specific resistance and should have been appropriately purified. Since such additives are frequently only added in low or very low concentrations which are significantly lower than the initiator concentration, a relatively low value for the specific resistance can sometimes be tolerated without the HR of the electrooptical system dropping excessively; this is the case, in particular, if the concentration of the additives, based on the weight of the overall system, is less than 1.0% and in particular less than 0.5%.

In addition to compounds of the formula I, the liquid-crystal mixtures used in the electrooptical systems according to the invention may also contain nitrile compounds of the formulae III–VI

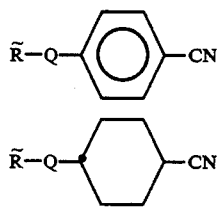
III

IV

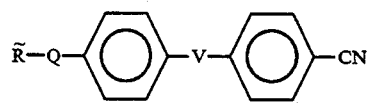
V

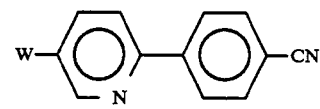
VI in which $\widetilde{R}$ is in each case, independently of one another, an alkyl group having 1–15 carbon atoms in which, in addition, one or two non-adjacent CH$_2$ groups may be replaced by —O—, —CO— and/or —CH=CH—, V is a single bond, —COO— or —OOC—,

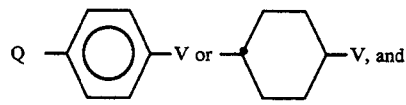

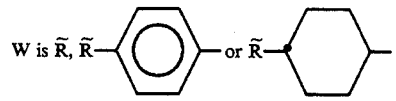

However, it has been shown that systems according to the invention whose liquid-crystal mixture contains more than 15% of nitrile compounds are frequently characterized by an inadequate HR value.

The proportion of nitrile compounds, based on the weight of the liquid-crystal mixture, is preferably small and is in particular no more than 10% and very particularly not more than 7.5%. Systems according to the invention whose liquid-crystal mixtures contain no nitrile compounds are very particularly preferred.

The liquid-crystal mixtures used according to the invention may contain further constituents which are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzylphenyl ethers, tolans and substituted cinnamic acids. The 1,4-phenylene groups in these compounds may also be fluorinated.

The liquid-crystal mixtures used in the electrooptical systems according to the invention preferably also contain one or more dielectrically neutral compounds of the formulae 1–5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are in each case, independently of one another, a bivalent radical from the group formed by —Phe—, —Cyc—, —Phe—Phe—, —Phe—Cyc—, —Cyc—Cyc—, —Pyr—, —Dio—, —G—Phe— and —G—Cyc— and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe—Cyc. The liquid crystals according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and optionally one or more components selected from the compounds of the formulae 1, 2, 3, 4 and 5 in which the radicals L and E are selected from the group comprising —Phe—Cyc—, —Cyc—Cyc—, —G—Phe— and —G—Cyc—.

In the compounds of the sub-formulae 1a, 2a, 3a, 4a and 5a, R' and R" are in each case, independently of one another, preferably alkyl, alkenyl, alkoxy, alkenyloxy or alkanoyloxy having up to 8 carbon atoms. In most of these compounds, R' and R" are different from one another, one of these radicals being, in particular, alkyl, alkoxy or alkenyl.

The proportion by weight of the compounds of the formulae 1–5 in the liquid crystals used according to the invention is preferably 0–50% and in particular 0–40%.

The liquid-crystal mixtures used in the electrooptical systems according to the invention preferably contain 1–98%, in particular 5–95%, of compounds of the formula I. The liquid crystals preferably contain 1–20, but in particular 1–15 and very particularly 1–12, compounds of the formula I.

A person skilled in the art can select, from the large pool of nematic or nematogenic substances, additives to the liquid-crystal mixtures described in such a manner that the birefrigence Δn and/or the ordinary refractive index $n_o$ and/or other refractive indices and/or the viscosity and/or the dielectric anisotropy and/or further parameters of the liquid crystal are optimized with respect to the particular application.

The electrooptical systems according to the invention are characterised by favorable values for the threshold voltage and the stiffness of the electrooptical characteristic line and by high UV and heat stability, high contrast and in particular by a high HR—even at elevated temperatures and during UV irradiation.

The problems which occur on addressing microdroplet or network systems by means of an active matrix are solved better by the electrooptical system according to the invention than in arrangements of this type described hitherto.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding applications Federal Republic of Germany P 41 02 215.7, filed Jan. 25, 1991 and Federal Republic of Germany P 41 04 183.6, filed Feb. 12, 1991, are hereby incorporated by reference.

EXAMPLE 1

A liquid-crystal mixture containing
10% of 4-(trans-4-pentylcyclohexyl)benzonitrile
8% of 4-(trans-4-hexylcyclohexyl)benzonitrile
6% of 4-(trans-4-heptylcyclohexyl)benzonitrile
8% of 4-(trans-4-(trans-4-ethylcyclohexyl)cyclohexyl)-1-trifluoromethoxybenzene
12% of 4-(trans-4-(trans-4-propylcyclohexyl)cyclohexyl)-1-trifluoromethoxybenzene
7% of 4-(trans-4-(trans-4-butylcyclohexyl)cyclohexyl)-1-trifluoromethoxybenzene
11% of 4-(trans-4-(trans-4-pentylcyclohexyl)cyclohexyl-1-trifluoromethoxybenzene
12% of 4-(trans-4-propylcyclohexyl)-3',4'-difluorobiphenyl
10% of 4-(trans-4-pentylcyclohexyl)-3',4'-difluorobiphenyl
5% of 1-(trans-4-(trans-4-propylcyclohexyl)cyclohexyl)-2-(4-trifluoromethoxyphenyl)ethane
5% of 1-(trans-4-(trans-4-pentylcyclohexyl)cyclohexyl)-2-(4-trifluoromethoxyphenyl)ethane
2% of 2-fluoro-4-(trans-4-propylcyclohexyl)-4'-propylcyclohexylbiphenyl
2% of 2-fluoro-4-(trans-4-pentylcyclohexyl)-4'-propylcyclohexylbiphenyl and
2% of 2-fluoro-4-(trans-4-pentylcyclohexyl)-4'-pentylcyclohexylbiphenyl
is stirred at room temperature with hexanediol diacrylate and benzil dimethyl ketal in a weight ratio of 50:47.5:2.5 until a clear solution is obtained. The between 2 transparent glass substrates provided with electrode layers, giving a uniform film having a thickness of 20 μm, which is cured by means of UV irradiation (30 W UV lamp). One of the electrode layers is in the form of an active TFT matrix, while the other electrode is the counter electrode. After curing, the system has an HR of 94.5.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrooptical system
   which comprises between 2 electrode layers, a liquid-crystal mixture and an optically transparent polymeric medium, one of the electrode layers being formed as an active matrix having nonlinear addressing elements integrated into the pixel, while the other electrode layer forms the counterelectrode,
   whose liquid-crystal molecules have an irregular alignment in the switched-off state,
   in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and
   which has reduced transmission in one of the two switching states compared with the other state, irrespective of the polarization of the incident light, and wherein
   the liquid-crystal mixture comprises not more than 15% by weight of nitrile compounds, and at least one compound of formula I

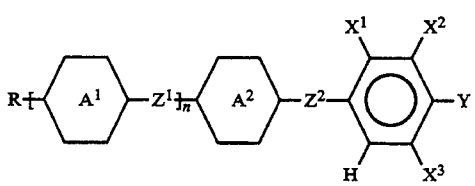

wherein p1 $Z^1$ and $Z^2$, independently of one another, are a single bond, —$CH_2CH_2$—, —COO—, —OCO— or —C≡C—, $A^1$— and —$A^2$—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of —$A^1$— and —$A^2$— is pyrimidine-2,5-diyl, pyridine-2,5-diyl or trans-1,3-dioxane-2,5-diyl, $X^1$, $X^2$ and $X^3$, independently of one another, are H or F, Y is —F, —Cl, —$OCF_3$, —$OCHF_2$ or —$CF_3$, n is 0, 1 or 2, and R is alkyl having up to 12 carbon atoms in which, in addition, one or two non-adjacent $CH_2$ groups may be replaced by —O— and/or —CH=CH—, and the polymerization of the optically transparent medium is initiated by a photoinitiator which forms free radicals.

2. A system according to claim 1, wherein the photoinitiator is a compound of formula II

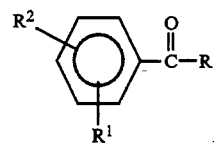

wherein
R is —$CR^3R^4R^5$ or

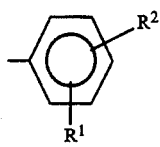

$R^1$ is H, halogen, alkyl having 1–12 carbon atoms in which up to 4 non-adjacent $CH_2$ groups are optionally replaced by —O—, —CO—, —COO—, —OCO—, —CH=CH— or —S—,

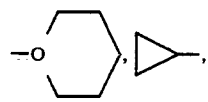

or 2 radicals $R^1$ in the ortho-positions to the carbonyl group are together a single bond,

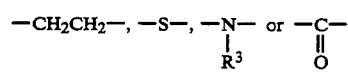

$R^2$ is H, halogen, alkyl having 1–12 carbon atoms in which one or 2 non-adjacent $CH_2$ groups are optionally replaced by —O— or —CH=CH—, or alkanoyl having 1–6 carbon atoms, $R^3$ and $R^4$ are each, independently of one another, H, halogen, hydroxyl, alkyl having 1–12 carbon atoms in which one or 2 non-adjacent $CH_2$ groups are optionally replaced by —O—, —CO— or —CH=CH—, or together are alkylene having 2–10 carbon atoms,

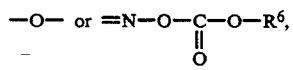

$R^5$ is H, alkyl having 1–12 carbon atoms in which one or 2 non-adjacent $CH_2$ groups are optionally replaced by —O— or

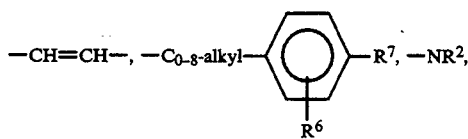

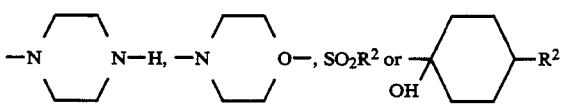

and $R^6$ and $R^7$ are each, independently of one another, H, halogen, $-NHR^2$, $-NR^2$ or alkyl having 1–10 carbon atoms in which one or 2 non-adjacent $CH_2$ groups are optionally replaced by $-O-$, $-CO-$, $-COO-$, $-OCO-$, $-S-$ or $-CH=CH-$.

3. A system according to claim 1, wherein the liquid crystal mixture comprises at least one compound of formula I2

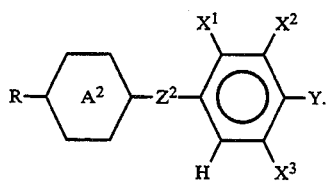

4. A system according to claim 3, wherein
R is $C_{1-10}$-alkyl or $C_{1-10}$-alkoxy;
$Z^2$ is $-CH_2CH_2-$, $-COO-$ or a single bond;
Y is $-F$, $-Cl$, $-OCHF_2$, $-OCF_3$ or $-CF_3$,
and at least one of $X^1$, $X^2$ or $X^3$ is not H.

5. A system according to claim 1, wherein the liquid crystal mixture comprises at least one compound of formula I3

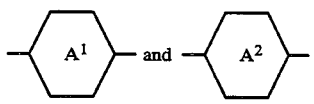

6. A system according to claim 5, wherein
R is $C_{1-10}$-alkyl or $C_{1-10}$-alkoxy;
Y is $-F$, $-Cl$, $-OCHF_2$, $-OCF_3$ or $-CF_3$;
$Z^1$ and $Z^2$ are independently $-CH_2CH_2-$, $-COO-$ or a single bond;
$X^1$ is H;
$X^2$ or $X^3$ or both $X^2$ and $X^3$ are F;

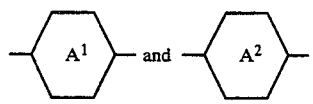

are independently trans-1,4-cyclohexylene, 1,4-phenylene optionally 2- or 3-monofluorinated or 3- and 5-difluorinated, pyrimidine-2,5-diyl, pyridine-2,5-diyl or trans-1,3-dioxane-2,5-diyl.

7. A system according to claim 1, wherein the liquid crystal mixture comprises at least one compound of formula I4

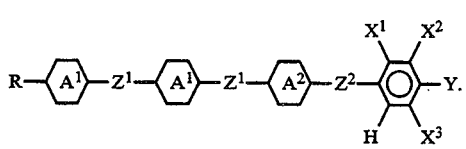

8. A system according to claim 7, wherein R is $C_{1-10}$-alkyl or $C_{1-10}$-alkoxy, not more than 2 of $Z^1$ and $Z^2$ are single bonds,

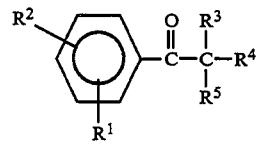

are independently trans-1,4-cyclohexylene, 2-fluoro-1,4-phenylene, 3-fluoro-1,4-phenylene, 1,4-phenylene, pyrimidine-2,5-diyl or pyridine-2,5-diyl.

9. A system according to claim 2, wherein the photoinitiator is a compound of formula IIa

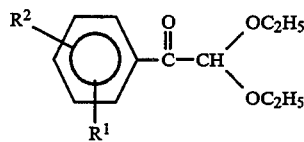

wherein $R^1$ and $R^2$ are each independently H, halogen, $C_{1-12}$-alkyl, $C_{1-12}$-alkoxy, $C_{2-12}$-alkenyl, $C_{1-6}$-alkanoyloxy or $C_{1-6}$-alkoxycarbonyl.

10. A system according to claim 2, wherein at least one of $R^1$ or $R^2$ is H.

11. A system according to claim 2, wherein one of $R^1$ or $R^2$ is oxahexyl, cyclopropyl, oxycyclopropyl, or contains a vinyl or vinylene group.

12. A system according to claim 2, wherein the photoinitiator has the formulae:

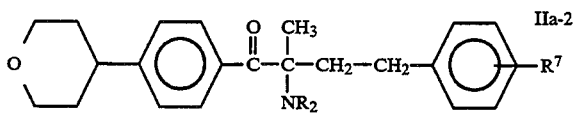

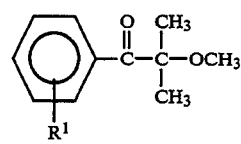

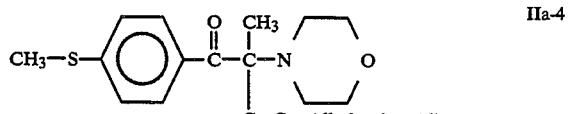

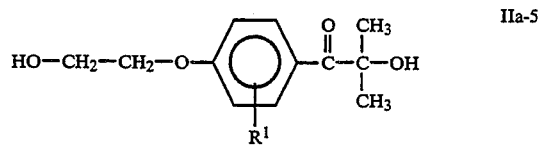

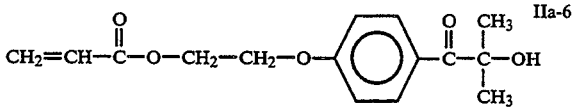

-continued

IIa-7
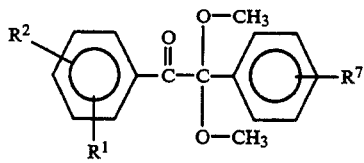

IIa-8
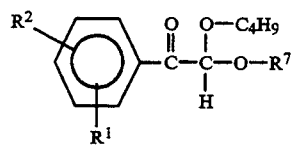

IIa-9
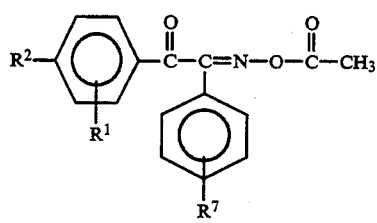

IIa-10
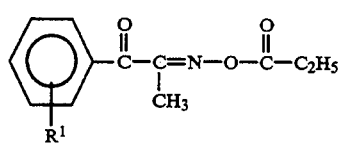

IIa-11
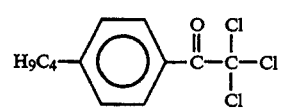

13. A system according to claim 2, wherein the photoinitiator has the formula:

IIb
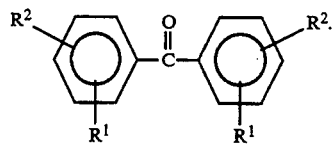

14. A system according to claim 2, wherein the photoinitiator has the formulae:

IIbα-1
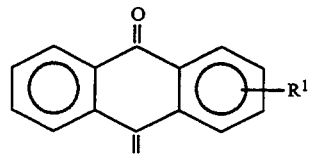

IIbα-2
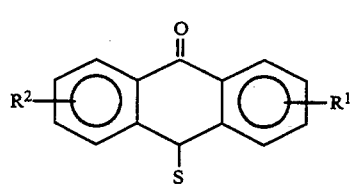

15. A system according to claim 2, wherein the photoinitiator has the formula:

IIbβ1
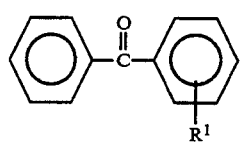

IIbβ2
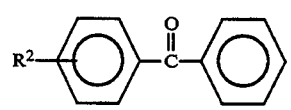

16. A system according to claim 1, containing less than 15% of nitrile compounds.

17. A system according to claim 1 which is essentially free of nitrile compounds.

* * * * *